(12) United States Patent
Aaron

(10) Patent No.: US 7,509,675 B2
(45) Date of Patent: Mar. 24, 2009

(54) NON-INVASIVE MONITORING OF THE EFFECTIVENESS OF ELECTRONIC SECURITY SERVICES

(75) Inventor: Jeffrey A. Aaron, Atlanta, GA (US)

(73) Assignee: AT&T Intellectual Property I, L.P., Bedminster, NJ (US)

( * ) Notice: Subject to any disclaimer, the term of this patent is extended or adjusted under 35 U.S.C. 154(b) by 937 days.

(21) Appl. No.: 10/159,757

(22) Filed: May 29, 2002

(65) Prior Publication Data

US 2009/0044277 A1 Feb. 12, 2009

(51) Int. Cl.
- G06F 11/00 (2006.01)
- G06F 7/04 (2006.01)
- H04K 1/00 (2006.01)
- H04L 12/24 (2006.01)
- H04L 12/26 (2006.01)
- H04L 29/06 (2006.01)

(52) U.S. Cl. .................... 726/22; 726/23; 726/24; 726/25; 726/26; 380/247; 380/248; 380/250

(58) Field of Classification Search .............. 726/22, 726/23, 24, 26, 25; 380/247, 248, 250
See application file for complete search history.

(56) References Cited

U.S. PATENT DOCUMENTS

| | | | |
|---|---|---|---|
| 5,806,961 A | 9/1998 | Dalton et al. | 362/183 |
| 5,892,903 A | 4/1999 | Klaus | 395/187.01 |
| 6,088,804 A * | 7/2000 | Hill et al. | 726/25 |
| 6,185,689 B1 | 2/2001 | Todd, Sr. et al. | 713/201 |
| 6,205,552 B1 | 3/2001 | Fudge | 713/201 |
| 6,298,445 B1 * | 10/2001 | Shostack et al. | 726/25 |
| 6,343,362 B1 * | 1/2002 | Ptacek et al. | 726/23 |
| 6,535,227 B1 | 3/2003 | Fox et al. | 345/736 |
| 6,584,569 B2 | 6/2003 | Reshef et al. | 713/201 |
| 6,647,400 B1 * | 11/2003 | Moran | 726/23 |
| 2003/0051163 A1 * | 3/2003 | Bidaud | 713/201 |

FOREIGN PATENT DOCUMENTS

EP   1160646 A2 * 12/2001

OTHER PUBLICATIONS

Min Wu, Robert C. Miller, Simson L. Garfinkel, "Do Security Toolbars Actually Prevent Phishing Attacks?", Apr. 2006, CHI '06: Proceedings of the SIGCHI conference on Human Factors in Computing Sytems, pp. 601-610.*

Internet Security Systems™; "Internet Scanner User Guide" Version 6.2.1; dated Nov. 2001; total pages 248.

* cited by examiner

Primary Examiner—Matthew B Smithers
Assistant Examiner—Courtney D Fields
(74) Attorney, Agent, or Firm—Hope Baldauff Hartman LLC

(57) ABSTRACT

Systems for the non-invasive monitoring of the effectiveness of a customer's electronic security services include a test generation engine for generating and launching a denatured attack towards a customer's network. A monitoring and evaluation agent is operatively coupled to the test generation engine and is adapted to monitor and evaluate the denatured attack. A recording and analysis engine is adapted to record and analyze the results of the denatured attack. Other systems and methods are also provided.

61 Claims, 14 Drawing Sheets

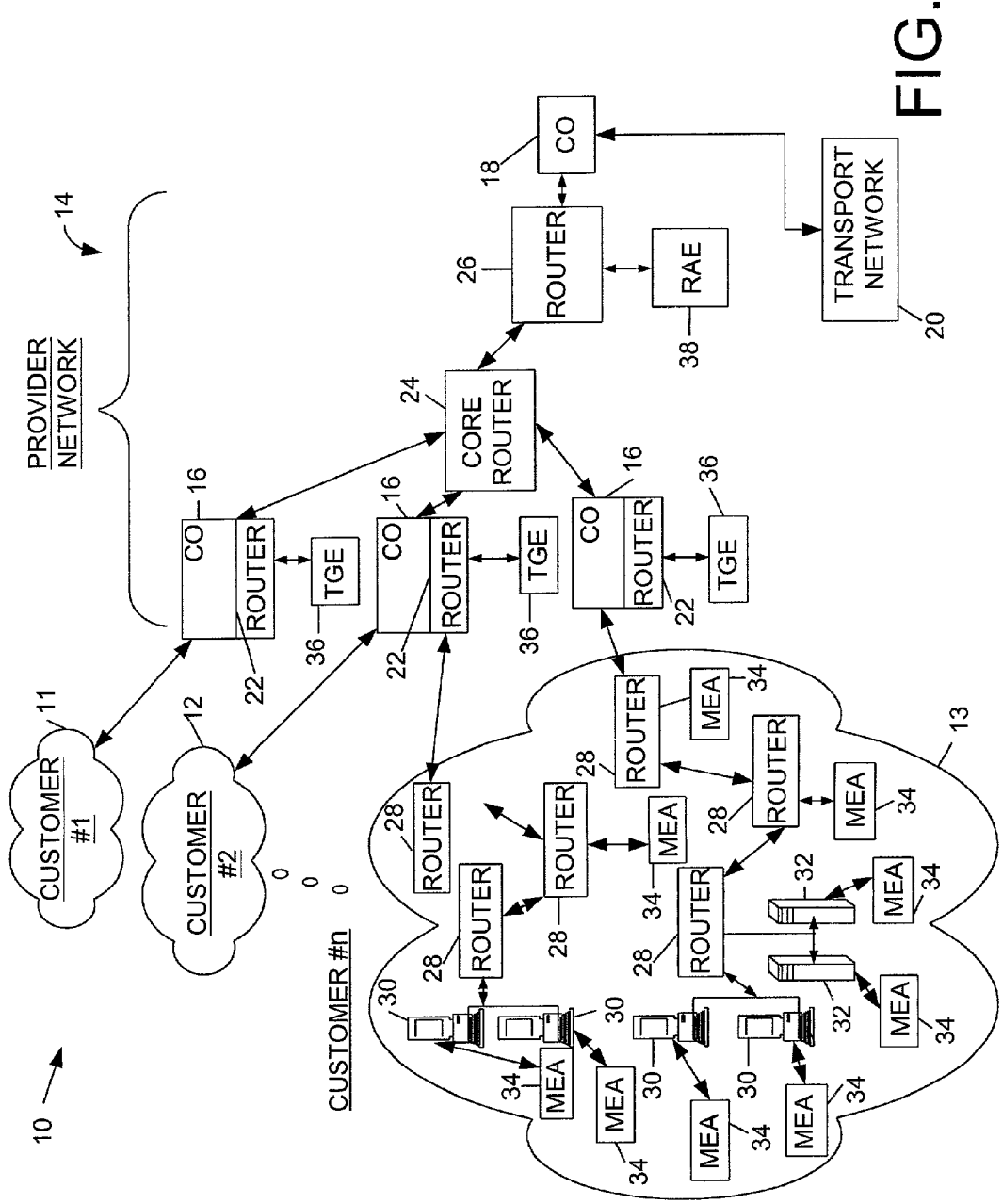

GLOBAL ICELOC
GLOBAL TEARDROPLOC
GLOBAL BOINKLOC
GLOBAL GEWSE5LOC
GLOBAL JOLTLOC
GLOBAL LANDLOC
GLOBAL NESTEALOC
GLOBAL NEWTEARLOC
GLOBAL OCTOPUSLOC
GLOBAL OOBLOC
GLOBAL OVERDROPLOC
GLOBAL SERVUKILLLOC
GLOBAL SYNK4LOC
GLOBAL ICQCRASHLOC
GLOBAL ICQFLOODLOC
GLOBAL ICQSPOOFLOC
GLOBAL MIRCKILLLOC
GLOBAL HANSONLOC
GLOBAL MULTILATELOC
GLOBAL HESTRALOC
GLOBAL DCD3CLOC
GLOBAL FOQERLOC
GLOBAL BEERLOC
GLOBAL BONKLOC
GLOBAL GHOSTLOC
GLOBAL IRCDKILLLOC
GLOBAL PEPSILOC
GLOBAL PONGLOC
GLOBAL RAPELOC
GLOBAL BIFFITLOC
GLOBAL SSPINGLOC
GLOBAL SYNDROPLOC
GLOBAL WARFTPDKILLLOC
GLOBAL DIELOC

FIG. 3

```
                    ← 42
┌─────────────────────────┐
│ GLOBAL ICE              │
│ GLOBAL TEARDROP         │
│ GLOBAL BOINK            │
│ GLOBAL GEWSE5           │
│ GLOBAL ICCQCRASH        │
│ GLOBAL ICQFLOOD         │
│ GLOBAL ICQSPOOF         │
│ GLOBAL JOLT             │
│ GLOBAL LAND             │
│ GLOBAL NESTEA           │
│ GLOBAL NEWTEAR          │
│ GLOBAL OOB              │
│ GLOBAL OCTOPUS          │
│ GLOBAL OVERDROP         │
│ GLOBAL SERVUKILL        │
│ GLOBAL SYNFLOOD         │
│ GLOBAL MIRCKILL         │
│ GLOBAL HANSON           │
│ GLOBAL MUTILATE         │
│ GLOBAL DCD3C            │
│ GLOBAL HESTRA           │
│ GLOBAL FOQER            │
│ GLOBAL BEER             │
│ GLOBAL BONK             │
│ GLOBAL IRCDKILL         │
│ GLOBAL PEPSI            │
│ GLOBAL PONG             │
│ GLOBAL PONG             │
│ GLOBAL RAPE             │
│ GLOBAL BIFFIT           │
│ GLOBAL SSPING           │
│ GLOBAL SYNDROP          │
│ GLOBAL WARFTPDKILL      │
└─────────────────────────┘
```

| |
|---|
| BAD PACKET |
| BRKILL |
| BUFFER OVERFLOW |
| CHRISTMAS TREE |
| COKE |
| DDOS |
| DEATH PING |
| FRAGMENTATION |
| INVERSE PROBING |
| JOLT |
| LAND.C |
| PONG |
| PROT SCAN |
| PROBE |
| PUKE |
| RECON |
| SCANNING |
| SESSION HIJACKING |
| SMURF |
| SPAM |
| SPOOF |
| SYN FLOOD |
| TEARDROP C |
| TROJAN |
| WINNUKE |
| VIRUS |

TO FIG. 13B

NON-INVASIVE MONITORING OF THE EFFECTIVENESS OF ELECTRONIC SECURITY SERVICES

TECHNICAL FIELD

The present invention is generally related to electronic security services and, more particularly, is related to the non-invasive monitoring of the effectiveness of electronic security services.

BACKGROUND OF THE INVENTION

Electronic security services such as anti-virus protection, hacker intrusion detection, electronic privacy protection and firewalls are technically complicated and difficult for customers to understand. Due to this complexity, it is also extremely difficult for customers or providers of electronic security services to verify that such services are in fact properly protecting the customers as intended. Furthermore, it is particularly difficult to effect such verification in a way that does not seriously inconvenience the customer or significantly degrade the customer's service, at least temporarily.

Thus, a heretofore-unaddressed need exists for a solution that addresses the aforementioned deficiencies and inadequacies.

SUMMARY OF THE INVENTION

The preferred embodiments of the present invention provide a system and method for the non-invasive monitoring of the effectiveness of a customer's electronic security services.

Briefly described, in architecture, one embodiment of the system, among others, can be implemented to include a test generation engine for generating and launching a denatured attack towards a customer's network, an agent operatively coupled to the test generation engine, the agent adapted to monitor and evaluate the denatured attack, and a recording and analysis engine operatively coupled to the test generation engine and the agent to record and analyze the results of the denatured attack.

The present invention can also be viewed as providing methods for the non-invasive monitoring of the effectiveness of electronic security services on a customer's network. In this regard, one embodiment of such a method, among others, can be broadly summarized by the following steps: launching a denatured attack over a communications network toward a monitored customer's network, and analyzing results of the denatured attack.

Other systems, methods, features, and advantages of the present invention will be or become apparent to one with skill in the art upon examination of the following drawings and detailed description. It is intended that all such additional systems, methods, features, and advantages be included within this description and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 1 is a block diagram of a preferred embodiment of a system for the non-invasive monitoring of electronic security services.

FIG. 2 is a table listing illustrative examples of attack modules included in a hacker toolkit available on the Internet.

FIG. 3 is a table listing illustrative examples of user-selectable attacks.

FIG. 5 is a table listing illustrative examples of attacks.

DETAILED DESCRIPTION OF THE PREFERRED EMBODIMENTS

Figure 4:
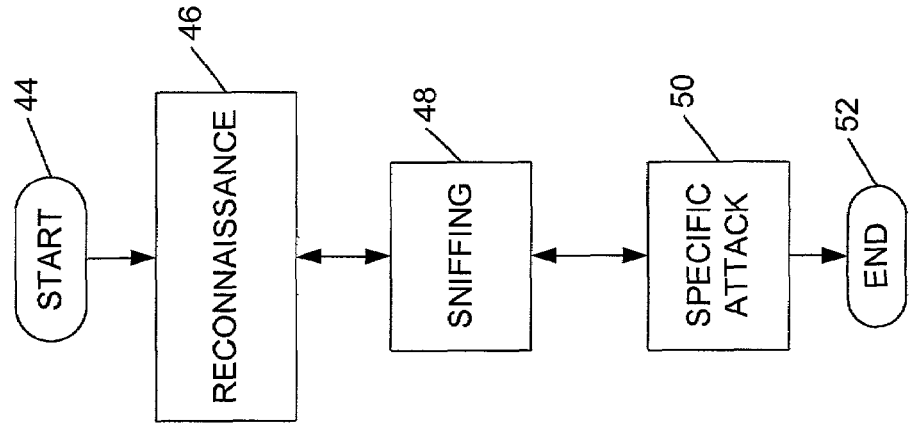
FIG. 4 is a flow chart of an embodiment of an implementation of a generic attack.

Disclosed herein are systems and methods for the non-invasive monitoring of the effectiveness of an electronic security service. To facilitate description of the inventive system, an example system that can be used to implement the non-invasive monitoring of the effectiveness of an electronic security service is discussed with reference to the figures. Although this system is described in detail, it will be appreciated that this system is provided for purposes of illustration only and that various modifications are feasible without departing from the inventive concept. After the example system has been described, an example of operation of the system will be provided to explain the manner in which the system can be used to provide the non-invasive monitoring of electronic security service.

I. System Overview

Referring now in more detail to the drawings, in which like numerals indicate corresponding parts throughout the several views, FIG. 1 is a block diagram of a preferred embodiment of a system 10 for the non-invasive monitoring of an electronic security service. The system 10 includes customer networks 11, 12, and 13 configured to communicate with a provider network 14. The provider network 14 can be provided and managed by a telecommunications company, such as Bell-South, Inc. The provider network 14 typically includes a central office 16 among other components. The central office 16 is a location that houses telecommunications equipment such as network switches and facility equipment. Traditionally, the central office 16 is linked to other central office(s) 18 in the provider network 14 using a telecommunications transport network 20. Personnel located within the central offices 16, 18 install, maintain, disconnect, monitor and troubleshoot equipment, facilities and services in the central office 16, 18. Central office personnel, or personnel in special central offices called "data centers," can also provide electronic security services to customers.

The central office 16, 18 includes a variety of equipment for servicing customers such as routers 22. Routers can be a separate device, or software in a computer, that directs information such as data packets, from one destination to another. The router 22 connects to the customer networks 11, 12, and 13, and then provider network 14, and determines which way to send each information data packet. A core router 24 in the provider network 14 can accept information data packets from a plurality of routers 22 and route them to a destination such as a centralized router 26. The centralized router 26 can be located in a specialized central office such as a data center or a network operations center, or the central office 16, 18. The network operations center is a facility responsible for managing and monitoring network resources and includes tools and resources used to accomplish those activities. The data center is a facility that manages a customer's data needs. The customer networks 11, 12, and 13 also includes routers 28 for routing information data packets from computing devices, such as personal computers 30, servers 32, or from other routers 28. In a preferred embodiment, the customer networks 11, 12 and 13 includes any devices or resources attached to that network.

In a preferred embodiment, attacks on the customer networks 11, 12 and 13 are monitored and evaluated by a monitoring and evaluation agent (MEA) 34. The MEA 34 can couple to routers 28, servers 32 and personal computers 30 (as well as special computers known as firewalls, intrusion detection systems, etc.). MEAs 34 serve to detect and monitor the local effects of attacks that are either launched from the provider network 14 or initiated by the MEA 34 itself in accordance with a test list and schedule received by the MEA 34.

In a preferred embodiment, a test generation engine (TGE) 36 performs the attacks launched from the provider network 14. The TGE 36 serves to generate tests based on test definitions and scheduling information received from a recording and analysis engine (RAE) 38. The TGE 36 launches those tests against the customer's network of personal computers 30, servers 32, and MEAs 34. In addition, the TGE 36 preferably handshakes with the MEAs 34 as needed to start and stop the test cycle. The RAE 38 serves to schedule tests, analyze and evaluate the test results collected from the MEAs 34. The RAE 38 also provides user interaction capability. Authentication and encryption protects communication between the TGE 36, RAE 38 and MEA 34. In a preferred embodiment, authentication and encryption includes an IP security protocol (IPsec) for authentication, encryption and message integrity. In an alternative embodiment, authentication and encryption includes a Secure Sockets Layer (SSL) for authentication and encryption.

The TGE 36 generates and launches test attacks over the network toward the monitored customer's network 11, 12 and 13. The attacks are "denatured" meaning the attack has been rendered harmless but remains in a format as close as possible to an actual attack so that the attack resembles an actual attack. In denaturing an attack, a sufficient amount of the harmful appearance of the attack is preserved for the attack to still be recognizable, especially by the technical methods used by security services present. Further, in denaturing attacks, only minimum changes are made that are necessary to remove actual harm to the customer's target systems. For instance, the customer's security resources and/or protections should still perform as if the denatured attack is an actual (i.e., non-denatured) attack, so that the customer's protections will still block/stop/deny the denatured attack. Thus, the denaturing is performed so as to remove actual chances of harm, but is done in a way that "fools" the customer's protective measures, e.g., firewalls, antiviruses, intrusion detection systems, etc. A preferred method is to test the customer's protective measures by arranging the denaturing such that the customer's protective measures perform as if the attack is harmful, even though it is no longer harmful. Therefore, the denatured attack should appear to any security services present as if it has not been denatured.

The attacks can be "denatured" in various ways including for example, (1) altering codes in a virus, trojan, etc. in order to render these harmless (although minimum alteration is used such that the virus, trojan, etc. would still be recognizable to code/signature checkers, which may depend on certain strings of code within the virus, trojan, etc. to be intact in order to recognize them); (2) replacing the virus, trojan, etc. with dummy code which acts externally the same (e.g., uses same ports, sends similar message, mimics actions except for those aspects which are harmful) in order that the dummy does no harm but otherwise is identical in important ways; and (3) for network-based attacks, replacing harmful bits in a "bad" or "malformed" packet, or sequences of bits in sequences of packets, with special codes so that reception can be verified but damage avoided.

In an alternative embodiment, where the packets or packet sequences cannot be changed in certain attacks which depend on and exploit responses to such packets (rather than relying on damage caused directly by the packet or packet sequence), the packets can be unaltered but the response or subsequent action (which would normally cause the pertinent damage) can be altered so that no actual harm accrues.

In a further, alternate embodiment, denaturing by "indirection" or "redirection" could also be done. The attack is changed such that, instead of targeting a resource (computer, server, etc.) within the customer's network, it is modified to target a nearby MEA 34. This approach is useful where it is impossible or undesirable to alter the harmful portion of the attack itself, but by redirecting it the original target can be removed from harm while the security services intervening between the TGE 36 and MEA 34 which are being tested will still encounter, and should recognize, the attack (such that the test remains valid). Some attacks, for instance, would no longer look like attacks if their harmful portions are modified, so to alter them in that way would result in an invalid test of the security services (i.e., there is no reason for any security service to block or protect against something which is completely harmless). This invention denatures by changing the target while retaining its harmful nature.

As new attacks are discovered, analyzed and denatured, they can be incorporated into the test/attack catalog of the TGE 36. Where appropriate, multiple TGEs 36 communicate with one another. This may be appropriate when certain specific attacks are by nature coordinated and need to originate from multiple sources. In addition, the TGE 36 communicates with the MEA 34. For example, the TGE 36 communicates with the MEA 34 when the MEA 34 requires advance knowledge of a planned test in order to properly monitor results.

In another alternative embodiment, multiple TGEs 36 are used when the monitored security service involves multiple components that require monitoring. Examples of monitored components include MEAs 34 placed on or near firewalls, intrusion detection systems, deceptions hosts (also referred to as "honeypots"), computer hosts, PCs, mainframes. Multiple TGEs 36 may be used in a hierarchical architecture, for instance, multiple TGEs 36 controlled and coordinated by one central scheduler, which may be part of the centralized RAE 38. Multiple TGEs 36 can more effectively cover multiple portions of a large network while avoiding undesired interactions with security measures which may be in place.

In a preferred embodiment, TGEs 36 are placed close to customers so as to avoid attacks being blocked by the provider's own security protections, rather than the customer's own security services which are intended to be monitored/tested. The provider is likely to have various security protections in place in its own network, such as firewalls, intrusion detection, etc. The attacks launched by the TGEs 36 should not encounter any of these during testing (unless these are to be monitored/tested as well) since they may block the attack before it ever reaches the customer's security protection, resulting in misleading results (which, in effect, measure the provider's security rather than the customer's).

II. Overview of Electronic Attacks on a Network

A discussion of a variety of attacks that can be made to a customer network 11, 12 and 13 is provided to facilitate an understanding of the present invention.

A. Hacker Tools

Hackers are individuals who obtain unauthorized or attempt to obtain unauthorized access to the customer's network 11, 12 and 13. Hacker toolkits exist and are available, for instance, on the Internet, that provide hackers with information and/or tools useful for penetrating the customer's network 11, 12 and 13.

FIG. 2 is a table 40 listing illustrative examples of attack modules included in a hacker toolkit available on the Internet. Toolkits can be software applications, but usually run on operating systems, for instance, Linux or Unix, instead of systems such as Microsoft Windows. FIG. 2 shows examples of attack modules available in a toolkit, however, numerous alternative embodiments of toolkits exist, and range from simple to very complex and elaborate. The toolkits often include a set of individual attack types which can be selected by the user (i.e., the hacker), either manually or as part of an automated "attack script."

FIG. 3 is a table 42 listing illustrative examples of user-selectable attacks. The individual attack names listed in FIG. 3, such as ice, teardrop, boink, jolt, land, nestea, newtear, etc., are examples of attack types that can be launched individually or included in one software program. There exists a great multitude of specific attacks and their variants, with sometimes only small technical differences resulting in very large differences of purpose, use, and effect. Also, some of these attacks are built upon other less complex attacks (i.e., some complex attacks are specific sequences of basic attacks), and many types of variants exist. New attack types are being constantly generated using widely available software tools and modules. Generally, the attacks consist of the transmission of various malformed packets, malformed network protocol interchanges, viruses, Trojan or backdoor software, mobile code (java, javascript, etc.), or any other transmission which is intended to discover and/or take advantage of potential vulnerabilities in a target system, e.g., customer's network 11, 12 and 13.

B. An Example of a Generic Attack

An unlimited number of attacks are possible, however, a focus on general similarities between threats allows for a grouping of processes into a "generic" attack. The generic attack is one example of an attack and does not capture all varieties and nuances of potential hacker activities, whether originating inside the customer's network 11, 12 and 13 or from the Internet.

FIG. 4 is a flow chart of an embodiment of an implementation of a generic attack. The process begins at step 44. At step 46, the hacker performs a "reconnaissance" activity. Reconnaissance involves broadly gathering information to identify existing network resources. The hacker also attempts to identify a subset of the network resources, which represents potential attack targets. Further, the hacker attempts to identify potential avenues of attack.

At step 48, "sniffing" occurs. Sniffing is passively gathering detailed data, usually by surreptitiously installing special software on a network entity (computer, router, etc.) which listens to all traffic passing by, making all information which was previously internal to the network now available to the intruder. This step may also include "scanning," or actively gathering detailed data. Scanning is similar technically to reconnaissance probes, in that information is gathered from responses received to various packets transmitted. A difference is that the scanning is done from inside the network being intruded upon. Thus, the intruder has much greater access to the network, and can gather much more information (of a much more sensitive nature since the hacker is now inside the perimeter protections, such as firewalls, such that the information obtained can be much more useful to the hacker). Sniffing is used to support one or more subsequent specific attacks (e.g., directed attacks). Sniffing and scanning may range from gathering information on specific IP addresses to the types of traffic and protocol elements being passed between nodes. This step may also include approaches such as "social engineering" or "dumpster diving" to gather passwords and other sensitive information.

At step 50, a specific "directed" attack occurs. The directed attack may generally include, (a) Denial of Service, (DoS) (b) "trawling" or otherwise gathering sensitive/valuable directory data, and (c) theft of service or service fraud. Additionally, customer privacy can be a concern, although this is not generally thought of as an "attack" per se. Bad packet attacks aimed against specific targets could be considered separately or considered to be DoS attack. Web page exploits, viruses, trojans, and other mal-ware program infestations would be considered to be "passive" attacks since they have to be initiated by the target itself. The virus waits passively to be retrieved, and only after retrieval and activation does the actual attack begin. On the other hand, worms, spread on their own. For example, worms do not have to be retrieved by the target but rather actively seek out subsequent targets from each site of infection. Worms automate the steps shown in FIG. 4, and thereby continue to repeatedly spread from each subsequent target attacked and infected. The process ends at step 52.

In a typical attack scenario, the steps shown in FIG. 4, occur in sequence over a period less than 24 hours. However, the steps of FIG. 4 may be combined when the attacker employs certain automated software tools, which utilize combination methods or reiterated probing-attack steps. Less frequently, these stages may be spread out over days or weeks, and in fact the most dangerous attacks are often those which employ low bandwidth probing techniques over a long period (e.g., "low and slow" attacks) since these types of attacks can be very difficult or impossible to detect except by the damage that eventually accrues.

Finally, post-attack, the attacker may repeat the steps of FIG. 4 so as to "propagate" the attack to another host entity in the customer's network or to another network. The attacker, capitalizing on the increased opportunities offered by a successful initial attack and also to increase the indirection existing between the attacker and the target often uses propagated attacks. For example, many successful attacks may have actually been accomplished via a "daisy chain" or string of four or more compromised machines, which often are chosen to be located in different time zones. Machines located in different time zones make it difficult to get the associated network management personnel on the telephone at the same time, which would be needed to troubleshoot how the attack is occurring and backtrack/identify the true attacker. Further, hacker strategy often includes extensive planning to mount a significant attack on a target using intermediary customer machines which are used for no other purpose than stepping stones, but otherwise left largely unharmed, that is, as long as the hacker's presence remains undiscovered.

1. The Reconnaissance Step

The "recon" or reconnaissance step is normally the initial hacker attack stage. The hacker in this step is concerned with the initial gathering of information that can be exploited to help the attacker access or exploit the target network. This stage is generally not focused on attacking a specific host or machine, but rather is an attempt to map out the various ways an attacker might expect to get into the network, e.g., the customer's network.

The associated time period of the reconnaissance step can be short or long. It is safer for the attacker to take more time, spacing out the actions over a considerable period of time, especially with networks that are monitored or secured in ways that may lead to someone noticing the hacker's attempts to probe. Likewise, the associated bandwidth of the probe can be large or small, and can vary. Again, it is safer for the attacker to use a low bandwidth probe, although this self-imposed restriction on bandwidth will generally mean that the recon stage will take longer to accomplish.

In simplest form, this stage seeks to identify the IP addresses of the ingress nodes for the target network, and subsequently to identify open ports and potentially usable protocols that may provide the means for intrusion. In more complex form, routers and network topology may be probed and mapped in order to support more complex intrusion techniques and attacks, which can involve multiple attacker machines and multiple ingress points, when present.

Reconnaissance can proceed from a single origin point or can be distributed using multiple machines to originate probes from different locations. When multiple machines are probing, its actions can be arranged individually or coordinated. Cases of extremely capable, elegant probing involve the efforts of many machines in a coordinated complex fashion. Furthermore, these capabilities are increasingly likely to be encountered because these techniques are increasingly incorporated into automated software i.e., hacker tool kits. In general, methods of probing processes available to the hacker community, include coordinated route tracing, e.g., mapping out network topology and latencies, and inverse probes, e.g., accumulating data on unreachable rather than reachable addresses (via receiving automated routing responses from the network).

The reconnaissance stage is most pronounced with external threats. In order to enter the target network, an external attacker must first map out the routes and potential entry points to that target network (e.g., customer's network) along with potential protocols and ports on the ingress nodes that may be usable.

2. The Sniffing Step

The sniffing step of FIG. 4 is concerned with gathering detailed information on network hosts, traffic types, protocols, etc. Simply accessing a target network's ingress node is usually not sufficient. Rather, access to those machines and hosts internal to the target network are usually desired. Therefore, in order to exploit the internal nodes, considerable information is required. First, the nodes of interest must be identified possibly by host name but ultimately by IP address. If the attacker can install "sniffer" software, network traffic may be observed so as to locate the most "interesting" machines, often the servers. DNS (name service) servers and LDAP (directory) servers, along with databases which can contain all kinds of sensitive information, e.g., financial or health info, passwords, employee records, would probably be perceived to be the most interesting potential targets.

Sniffing is generally passive, i.e., listening only, rather than generating or sending traffic. Distributed sniffing, e.g., sniffing from multiple locations inside the target network, is often employed when possible. Distributed sniffing is utilized when the network has switching systems to effectively subdivide the network. This limits how much traffic any individual sniffer can sample.

Active scanning can also be employed, when attempts are made to connect to a succession of IP addresses and port numbers. Scanning can be used (by the responses received or not received) to identify which addresses are present in the target network and which ports are available on the machines thus identified. The information obtained may then be sent back to, or retrieved by, the attacker via a number of more or less covert or stealth techniques. These techniques can include encryption and communications using unexpected channels or ports or protocols, i.e., for which they generally were not designed, and thus are less likely to be detected. Likewise, the attacker may communicate into the network via encryption using unexpected channels or ports or protocols in order to send commands to software implanted in exploited hosts.

Although passive sniffing is limited in the sense that the attacker must wait for traffic to be observed rather than actively scanning for items of interest, sniffing is less intrusive and thus safer for the attacker. Sniffing may in fact be present without anyone realizing, and considerable information may thus be gathered. In contrast, scanning may be readily identified when network intrusion detection methods are employed or when the scanning is done at such high bandwidth that it becomes indirectly observable. The presence of a sniffer because its action is passive, i.e., listening only, is hard to detect. Active probing for the presence of a sniffer is unreliable but sometimes possible, but hacker software will sometimes detect this and respond negatively, e.g., damaging the files on the machine on which it has been surreptitiously installed.

Additional information, which may be obtained by the attacker in this stage, includes protocol version numbers, operating system types and version numbers. The attacker can also obtain application software types and version numbers, configuration options, general and specific information on what is happening in the customer's network and what the customer's network is being used for. Further, hackers try to obtain specific port numbers on which the various host machines are "listening."

3. The Direct Attack Step

The directed attack is an attack on a specific target machine, usually with a specific and harmful objective in mind. Directed attacks are sometimes employed to accomplish one or both of the two preceding stages. There are many kinds of directed attacks. Directed attacks range from simple SYN flood denial of Service (DoS) attacks (in which only the initial "SYN" portion of the TCP 3-way handshake is sent, but in great volume, so as to tie up the resources of the recipient), session redirection and hijacking, to complete takeovers of targeted systems to elaborate spoofing of intrusion detection systems.

Simple flooding can crudely overwhelm a host with too much traffic, or alternatively, can use up system resources by employing a multitude of "half-open" TCP/IP connection attempts that completely utilize the target machine's processor (e.g., a SYN flood). Other more pernicious DoS attacks, such as fragmentation attacks (e.g., land.c, death ping, etc.), do not just temporarily occupy the attention of a target host, but actually crash the operating system via exploitation of particular software bugs, which often remain present in practice even when software fixes/patches are available. Fragmentation attacks take advantage of variable overflow that can occur upon reassembly of specially fragmented IP packets, which were purposefully designed by the hacker to exceed the maximum allowed/expected size.

An adjunct to DoS crash attacks is a more elaborate approach, which seeks first to install harmful software or make harmful modifications prior to the actual DoS crash attack. With this approach, unless the target machine is completely re-initialized from backup media, re-booting the machine causes subsequent crashes and additional damage, and possibly even more effects such as propagated attacks. This approach assumes that the attacker has effective methods of gaining authorization to insert software on the target machine. An attacker may gain access to the target machine by gaining access to the root shell or administrator account of a machine either via a variable/buffer overflow, or via a forced "controlled crash" of a running process inherently having these authorizations on the target machine.

Protocol attacks involve exploitation of the actual communications exchanges in a defined protocol. The objective may range from simply interfering with the action of the protocol, as in a DoS attack, to causing a specific and normally unexpected result via the protocol. A variety of protocol attacks are known.

Session hijacking generally involves taking control of a TCP/IP session, i.e., forcefully taking the place of one of the two legitimate parties. This can be accomplished via a successful observation and determination of the sequence numbers occurring in the TCP/IP exchange (e.g., a sequence number attack) which allows the substitution of illegitimate packets into the session. This is normally done while simultaneously mounting a DoS attack on the party that is being substituted, so that it cannot interfere with, or otherwise thwart, the hijacking process. Once the session is hijacked, the attacker appears to be, and acts as, the actual substituted party, with all the authorizations and access associated with the substituted party. The attacker has this authorization at least for the duration of the session, and possible afterwards if the attacker can glean sufficient additional information, such as passwords, cryptographic keys, etc., during the lifetime of the hijacked session.

Email attacks include simple techniques such as email flooding and spamming. Email flooding sends a large email message to many recipients, overloading the email system and in some cases causing system crashes of the mail server. Spamming sends unsolicited advertisements, or other undesired messages, to many recipients.

Email is also a vector, i.e., delivery or infection mechanism, for well-known types of hostile software such as viruses, Trojan horses, worms, etc. Viruses and trojans usually require a specific user action to be activated. Worms activate and propagate without user action, instead they rely on and exploit some "action" or capability occurring automatically in the operating system or other running software process. Hostile software of these sorts can be designed to perform virtually any function possible on the infected machine, with potentially disastrous results. Worms are receiving increased attention in the hacker community since users are now generally aware of the dangers of viruses and trojans.

Propagated attacks involve a "stepping stone" approach to move from one exploited host to the next, and then finally attack the ultimate target in a harmful fashion. When propagated attacks are done across the Internet, the Internet provides indirection that helps the attacker escape easy detection and identification. When propagated attacks are done inside one or more smaller networks, it usually embodies a more insidious attempt to surreptitiously control more resources, and in some cases may even be a prelude to a larger scale attack against a service provided on that network or elsewhere. Larger scale attacks can be triggered remotely i.e., via a covert communications channel, or via timers e.g., on a particular date. Distributed Denial of Service (DDoS) attacks are a special case of this where large numbers of compromised computers become "zombies" under the hacker's remote control for the purpose of launching coordinated large-scale DoS attacks against a target. Large scale attacks may take considerable time to set up, requiring multiple intrusions on multiple machines in advance, and they may potentially result in broadly disastrous consequences. A large scale attack may attempt to bring down a service, or may have other less crude objectives such as, for example, a large scale privacy violation and public exposure with respect to many customers for instance, intending a subsequent flurry of customer litigation as the actual goal.

Finally, "stealth" refers to attackers trying to cover their tracks or otherwise escape notice. There are many ways to do this. Some of the simplest include log erasure and process modifications to hide the attacker's presence once a machine in successfully accessed and exploited. Also, "fast takedown" techniques can sometimes be used to exploit certain aspects of specific operating systems so as to effectively hide the hacker's presence on a machine, e.g., by very quickly initiating some alteration, which interferes with or avoids the normal process registration within the operating system. Additional techniques include "camouflage" of communications and piggybacking on legitimate communications flows. Steganography, the cryptographic hiding of information within another information stream is similarly utilized. Software mutation techniques, as in mutating viruses, etc. also fall in this general category.

C. Examples of Attacks

FIG. 5 is a table 54 listing illustrative examples of attacks. The attacks are any one of many possible hostile actions or techniques employed against a customer's network, system, or attached host or machine. Attacks are generally undertaken as a direct or indirect means to gain unauthorized access or otherwise exploit the target(s).

Figure 6:
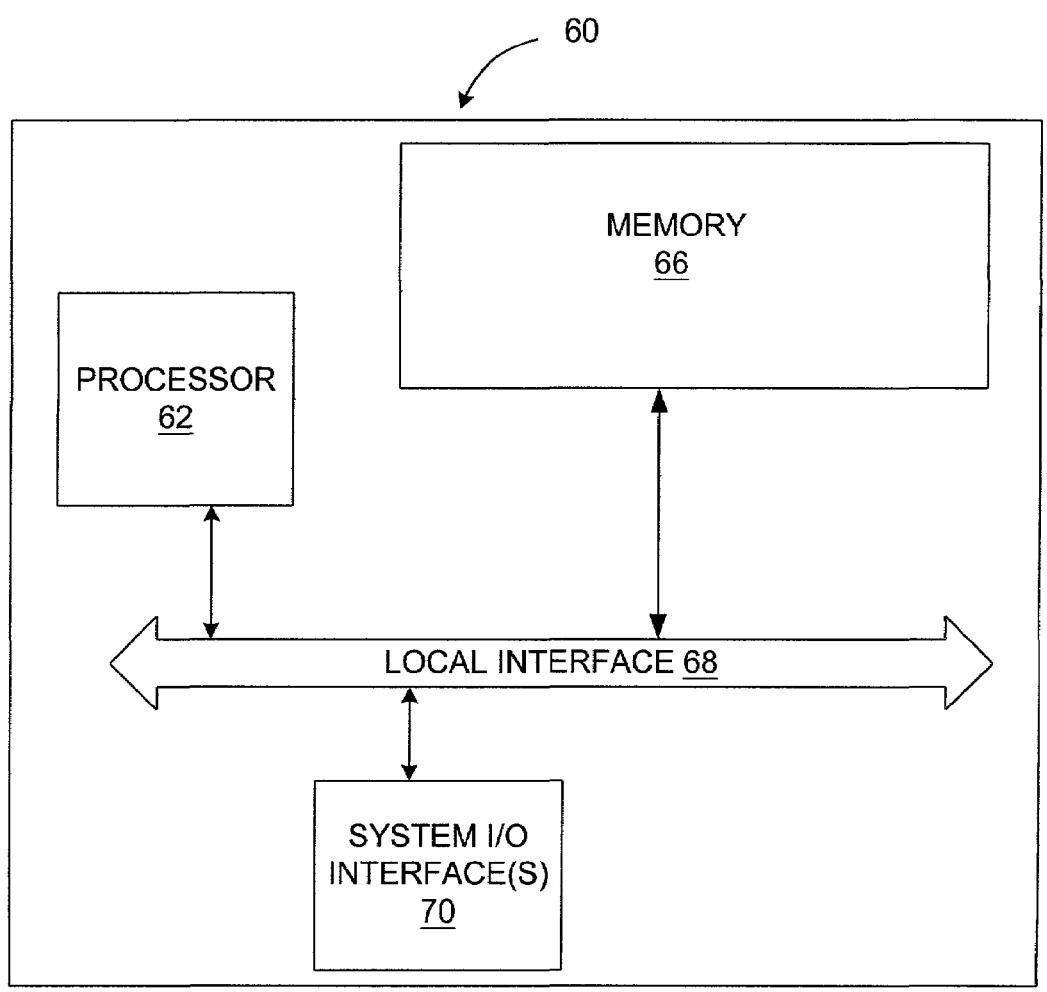
FIG. 6 is a block diagram depicting a generic computer or processor-based system that can be used to implement a preferred embodiment of each of a monitoring and evaluation agent, test generation engine and recording and evaluation engine of the system for the non-invasive monitoring of an electronic security services.

III. Elements of the System for the Non-Invasive Monitoring of Electronic Security Services FIG. 6 is a block diagram depicting a generic computer or processor-based system that can be used to implement a preferred embodiment of each of the MEA, TGE and RAE of the system for the non-invasive monitoring of an electronic security service. Generally, in terms of hardware architecture, as shown in FIG. 6, the digital computer 60 includes, inter alia, a processor 62 and memory 66. Input and/or output (I/O) devices (or peripherals) can be communicatively coupled to a local interface 68 via a system I/O interface 70, or directly connected to the local interface 68. The local interface 68 can be, for example but not limited to, one or more buses or other wired or wireless connections, as is known in the art. The local interface 68 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 62 is a hardware device for executing software, particularly that stored in memory 66. The processor 62 can be any custom made or commercially available processor, a central processing unit (CPU), an auxiliary processor among several processors, a semiconductor based microprocessor (in the form of a microchip or chip set), a macroprocessor, or generally any device for executing software instructions.

The memory 66 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 66 may incorporate electronic, magnetic, optical, and/or other types of storage media. Note that the memory 66 can have a distributed architecture, where various components are situated remote from one another, but can be accessed by the processor 62.

The software and/or firmware in memory 66 may include one or more separate programs, each of which comprises an ordered listing of executable instructions for implementing logical functions. In the example of FIG. 6, the software in the memory 66 can include MEA, TGE or RAE logic and a suitable operating system (O/S). The operating system essentially controls the execution of other computer programs, and provides scheduling, input-output control, file and data management, memory management, and communication control and related services.

The logic is a source program, executable program (object code), script, or any other entity comprising a set of instructions to be performed. When the logic is implemented as a source program, then the program needs to be translated via a compiler, assembler, interpreter, or the like, which may or may not be included within the memory 66, so as to operate properly in connection with the O/S. Furthermore, logic can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices may include input devices, for example but not limited to, a keyboard, mouse, scanner, microphone, etc. Furthermore, the I/O devices may also include output devices, for example but not limited to, a printer, display, etc. Finally, the I/O devices may further include devices that communicate both inputs and outputs, for instance but not limited to, a modulator/demodulator (modem; for accessing another device, system, or network), a radio frequency (RF) or other transceiver, a telephonic interface, a bridge, a router, etc.

When the logic is implemented in software, as is shown in FIG. 6, it should be noted that logic can be stored on any computer-readable medium for use by or in connection with any computer related system or method. The logic can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the logic is implemented in hardware, the logic can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

A. MEA

Figure 7:
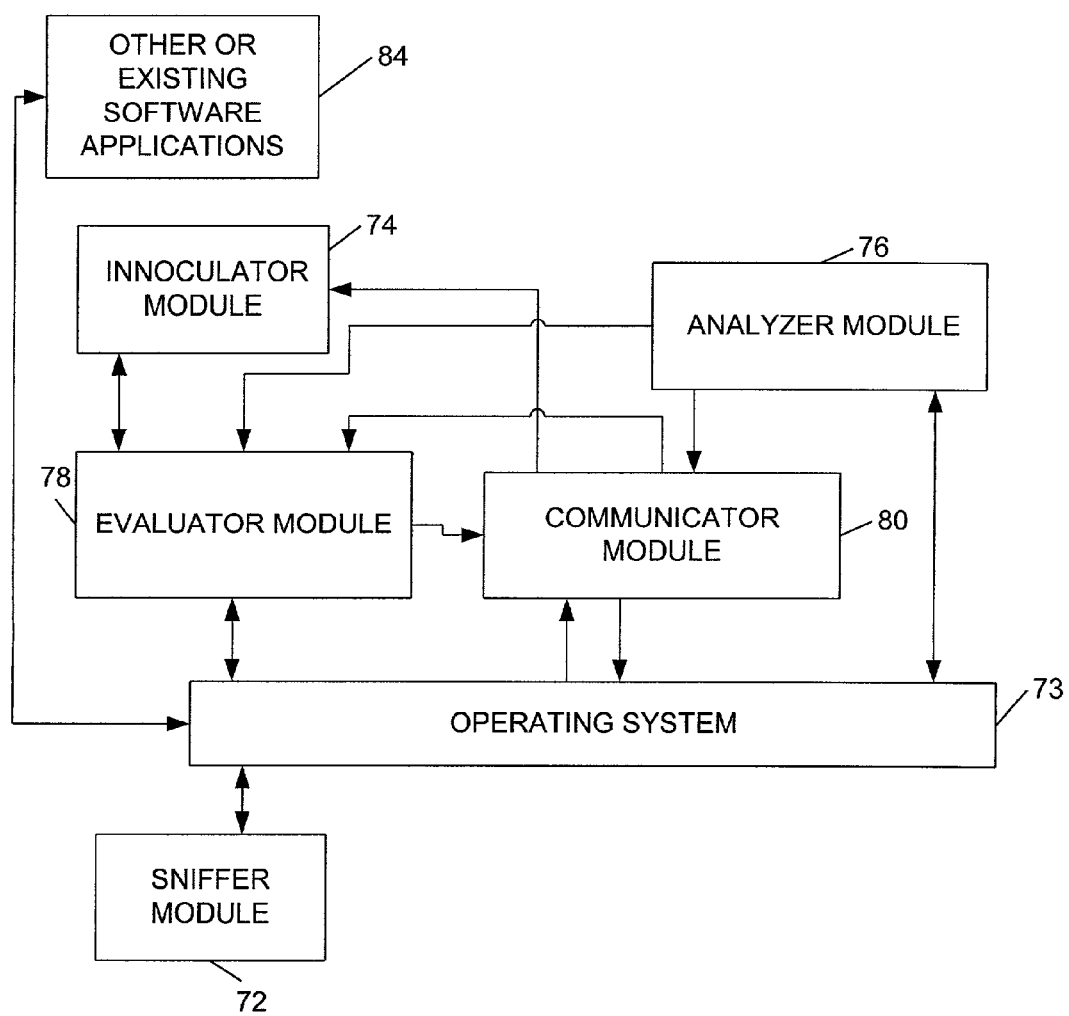
FIG. 7 is a block diagram depicting a preferred embodiment of logic of a monitoring and evaluation agent of the system for the non-invasive monitoring of electronic security services.

Referring to FIG. 7, a block diagram depicting a preferred embodiment of logic of the MEA 34 of the system 10 for the non-invasive monitoring of electronic security services is shown. The MEA logic could exist in memory, such as memory 66 of FIG. 6. In another embodiment, the MEA logic could be resident in a monitoring device, utilizing the device hardware. The MEA 34 includes a sniffer module 72, an innoculator module 74, an analyzer module 76, an evaluator module 78 and a communicator module 80. In an alternative embodiment, the MEA 34 includes a decryption/encryption module and a cryptographic key module. The sniffer module 72 in a preferred embodiment couples to the operating system 73 and a network interface card (not shown) for communicating with the provider network via the customer network, in which the MEA 34 is generally located. In a preferred embodiment, the communicator module 80 couples to the operating system 73, analyzer module 76, evaluator module 78 and innoculator module 74. The evaluator module 78 in a preferred embodiment couples to the operating system 73, communicator module 80, analyzer module 76, and innoculator module 74. In a preferred embodiment, the innoculator module 74 couples to the evaluator module 78 and communicator module 80. The operating system also couples to other or existing software applications 84.

1. Sniffer Module

The sniffer module 72 observes all the packets such that patterns can be identified.

2. Innoculator Module

The innoculator module 74 checks for special code/bits in packets and/or checks pre-received communication for a pre-planned attack or test. For instance, the innoculator module 74 can check for an authenticated and encrypted message from the RAE 38 or TGE 36 with a date/time stamped list of scheduled attacks or tests.

3. Analyzer Module

The analyzer module 76 receives or determines the list of open ports and active services on the customer's network 11, 12, and 13, to know what general and specific vulnerabilities may exist in the customer's network 11, 12 and 13. The analyzer module 76 can also view or determine if new applications, services or other items are installed, for example, a newly installed denatured virus, trojan, etc. Further, by using available software engineering methods, the analyzer module 76 can monitor other aspects of the host in which it resides, such as monitoring password changes or log alterations. In addition, the analyzer module 76 can monitor security devices to which it is attached. Where a firewall is used, the analyzer module 76 can monitor the types of packets blocked by the firewall.

In the case where an intrusion detection system is used, the analyzer module 76 can monitor attacks detected. In the case of a deception host, the analyzer module 76 monitors hacker activities such as probes, accesses and rootkit or hacker tool insertion. A matching algorithm can be used to determine potential associations with a pre-planned test or list of active tests. Thus, the progress of a denatured attack or test can be monitored so that it can be reported properly to the RAE 38.

4. Evaluator Module

The evaluator module 78 determines which attacks or tests would have caused damage if not denatured.

5. Communicator Module

The communicator module 80 listens and talks to the network provider's centralized RAE 38 and TGE 36.

The communicator module 80 acts as the communications interface between the other modules. It receives communications from the provider network 14 and likewise accepts communication from the tester in order to transmit these over the provider network. The communicator module 80 functions as a translator. Such translation is needed since software components, i.e., the modules of the RAE 38, typically use data in somewhat different technical form or format than the form or format of data, which is transported over a typical provider network 14. The communicator module 80 can use well-known methods for secure authenticated network communications, e.g., IPSEC, SSL, or SSH when communicating with TGEs 36 and the RAE 38. Via authentication, these secure communication methods ensure that no unauthorized entity can masquerade as a TGE 36, RAE 38, or MEA 34 i.e., impersonate a TGE 36, RAE 38, or MEA 34. Via encryption, it further ensures that no unauthorized entity can intercept, eavesdrop upon, or alter any of the secured communications. The communicator module 80 maintains the shared secrets, cryptographic keys, and/or security certificates utilized to enable these secure communication methods.

Other modules such as a decryption/encryption module can be included to enable the MEA 36 to look inside encrypted communications, for instance in virtual private networks (VPNs). Another module such as, a cryptographic key module can be included to hold and manage the associated crypto/secret keys.

B. TGE

Figure 8:
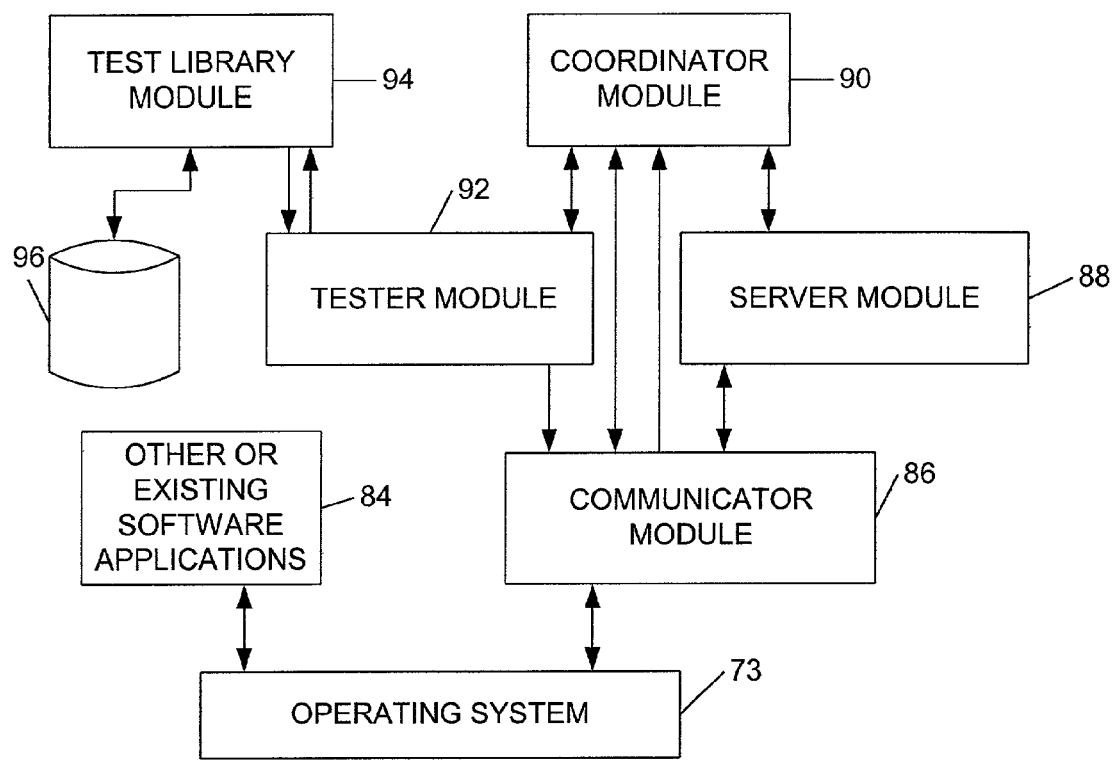
FIG. 8 is a block diagram depicting a preferred embodiment of logic of a test generation engine of the system for the non-invasive monitoring of electronic security services.

FIG. 8 is a block diagram depicting a preferred embodiment of logic of the TGE 36 of the system 10 for the non-invasive monitoring of electronic security services. The TGE logic could exist in memory, such as memory 66 of FIG. 6. In other embodiments, the TGE logic could be resident on a monitored device, utilizing the device hardware. The TGE 36 includes a communicator module 86, a server module 88, a coordinator module 90, a tester module 92, and a test library module 94. In a preferred embodiment, the operating system 73 couples to the communicator module 86, other or existing software applications 84, and the network interface card (not shown) utilized for communicating with the provider network. The server module 88 in a preferred embodiment couples to the communicator module 86 and coordinator module 90. In a preferred embodiment, the communicator module 86 couples to the server module 88, coordinator module 90, operating system 73 and tester module 92. The tester module 92 in a preferred embodiment couples to the communicator module 86, coordinator module 90, and test library module 94. In an alternative embodiment, the test library module 94 has access to database 96, such as oracle.

1. Tester Module

The tester module 92 performs the actual testing except for tests, which are initiated by MEAs 34 rather than TGEs 36. Controlled by the coordinator module 90, the tester module 92 launches attacks at customer hosts and MEAs 34 as directed. The tester module 92 utilizes the test library module 94 to obtain data as to how to construct the tests. For example, for a Land attack, the tester module 92 will consult the library to determine the exact packet structure to employ, and substitutes the target IP address with a denatured IP address into the packet structure to obtain the actual packet to be launched. The tester module 92 serves as the "weapon," which obtains its "ammunition" bullets from the test library module 94, or uses the test library module 94 to find out how to build its bullets, and then fires them at the targets.

2. Test Library Module

The test library module 94 provides standard database access functionality, e.g., via SQL or Structured Query Language, to enable provisioning and access of a standard database, such as an Oracle database, which contains test or attack related data. The tester module 92 utilizes this functionality. The test library module 94, via its associated database 96 provides the detailed information needed to construct each type of attack based upon test definition data. Because of the large number and growing variety of potential attack types, and because attacks can be quite complex and thus difficult to generate, the amount of data is assumed to require a large database external to the module. In an alternative embodiment, the test library module 94 aggregates and pre-formats retrieved test definition data for use by the tester module 92.

3. Coordinator Module

The coordinator module 90 obtains schedule information from the RAE 38 via the communicator module 86, handshakes with the MEAs 34 via the communicator module 86, to signal "ready" and "finished," and handshakes with other TGEs 36 as appropriate via the communicator module 86. The coordinator module 90 works with the TGEs 36 for cooperative tests requiring multiple TGE 36 sources. The coordinator module 90 also controls the server so that it is properly set-up to respond to scheduled requests from MEAs 34, and controls the tester module 92 to launch the appropriate tests, which it has received from the RAE 38 at the appropriate time. Each TGE 36 may also send a "finished" message via the communicator module 86 to the RAE 38 to let the RAE 38 know it has completed its portion of testing for a particular customer. This allows the RAE 38 to get ready to receive results from the MEAs 34.

4. Server Module

The server module 88 provides the TGE 36 with standard web, file, and email serving functionality. This is needed since some tests must be initiated by the MEAs 34 rather than the TGEs 36, when requesting web pages, files, or emails which contain a test/attack such as a Javascript exploit, trojan, or virus. In these cases, the closest TGE 36 acts as the standard server to provide the infected web page, file, or email requested. Once the infected item is provided, the attack will then begin and can be monitored by the pertinent MEA 34.

5. Communicator Module

The communicator module 86 acts as the communications interface between the other modules (except the test library module 94) and the provider network. It receives communications from the provider network in order to provide these to the tester or server, and likewise accepts communication from the tester in order to transmit these over the provider network. The communicator module 86 functions as a translator. Such translation is needed since software components, i.e., the modules of the RAE 38, typically use data in somewhat different technical form or format than the form or format of data, which is transported over a typical provider network. The communicator module 86 can use well-known methods for secure authenticated network communications, e.g., IPSEC, SSL, or SSH when communicating with TGEs 36 and the RAE 38. Via authentication, these secure communication methods ensure that no unauthorized entity can masquerade as a TGE 36, RAE 38, or MEA 34 i.e., impersonate a TGE 36, RAE 38, or MEA 34. Via encryption, they further ensure that no unauthorized entity can intercept, eavesdrop upon, or alter any of the secured communications. The communicator module 86 maintains the shared secrets, cryptographic keys, and/or security certificates utilized to enable these secure communication methods.

C. RAE

Figure 9:
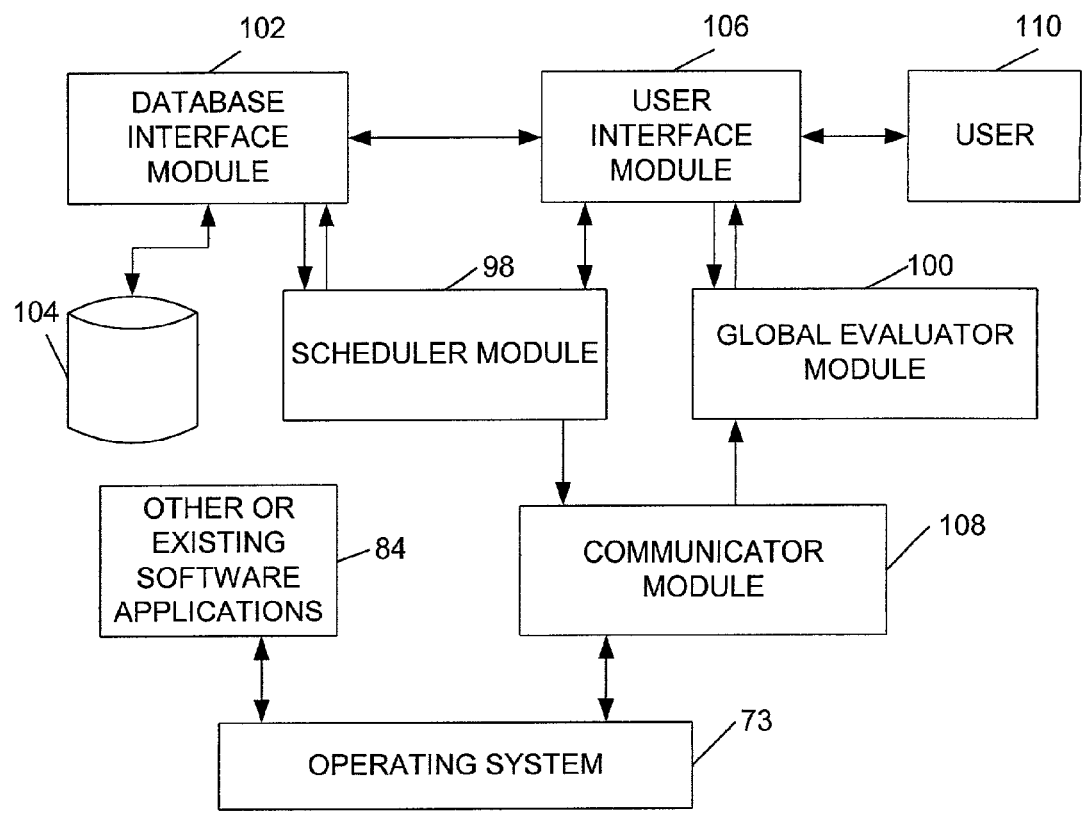
FIG. 9 is a block diagram depicting a preferred embodiment of logic of a recording and analysis engine of the system for the non-invasive monitoring of an electronic security services.

FIG. 9 is a block diagram depicting a preferred embodiment of logic of the RAE 38 of the system 10 for the non-invasive monitoring of electronic security services. The RAE logic could exist in memory, such as memory 66 of FIG. 6. In other embodiments, the RAE logic could be resident in a monitored device, utilizing the device hardware. The RAE 38 includes a scheduler module 98, a global evaluator module 100, a database interface module 102, a user interface module 106 and a communicator module 108. In a preferred embodiment, the operating system 73 couples to the communicator module 108, other or existing software applications 84, and the network interface card (not shown) utilized for communicating with the provider network. The scheduler module 98 in a preferred embodiment, couples to the communicator module 108, database interface module 102 and user interface module 106. In a preferred embodiment, the communicator module 108 couples to the global evaluator module 100, scheduler module 98, and operating system 73. The global evaluator module 100 in a preferred embodiment, couples to the communicator module 108 and user interface module 106. The user interface module 106 in a preferred embodiment, couples to the database interface module 102, scheduler module 98, global evaluator module 100, and a user 110. In a preferred embodiment, the database interface module 102 has access to a standard database 104, such as an Oracle database, and couples to the scheduler module 98 and user interface module 106.

1. Scheduler Module

The scheduler module 98 provides the central test scheduling functionality and makes test schedule information available to TGE 36s and MEAs 34 via the communicator module 108. The scheduler module 98 is controlled by the user interface module 106. The scheduler module 98 makes use of the database interface module 102 to include customer information as appropriate, in order to build schedules while incorporating certain data, such as the particular TGE 36s and MEAs 34 serving a particular customer, into the schedule process.

2. Global Evaluator Module

The global evaluator module 100 analyzes data returned by all the MEAs 34 serving a customer in the course of a test cycle, this data being received from the MEAs 34 via the communicator module 108. Whereas the MEAs 34 provide local results of test results obtained by a given MEA 34 at its location or for its immediate vicinity, the global evaluator module 100 uses all of these local results to obtain the overall results of the testing for a given customer. Thus the progress of a test attack can be traced as it made its way through the customer network 11, 12 and 13 to its target, or conversely was stopped at some point (presumably by one of the security services being monitored/tested). The global evaluator module 100 obtains the pertinent test schedule from the scheduler module 98, compares this with the MEA 34 results, and evaluates whether individual MEA 34 results or combinations of MEA 34 results indicate a particular test outcome for the customer. In a preferred embodiment, the global evaluator module 100 applies a set of If/Then rules to make this determination for each test included in the schedule e.g., if certain files or memory locations were erased or altered, or if certain email actions occurred, then attack by test # 123 for virus xyz was successful. This evaluation can be wholly implemented via code within the global evaluator module 100, or can include the referencing of an "expected test result" database which can be wholly included in the module, or if necessary can be an externally located standard database.

3. Database Interface Module

The database interface module 102 provides standard database access functionality e.g., via Structured Query Language (SQL) to enable provisioning and access of a standard database, such as an Oracle database, which contains customer data. The scheduler module 98 utilizes this functionality. The user interface module 106 can also utilize the database interface module 102 to provision, or load, the database with the necessary customer data. A data interface module 102 can also be used to provide an interface to an external database for the global evaluator module 100.

4. User Interface Module

The user interface module 106 provides standard user interaction functionality via a standard windowing Applications Programming Interface (API) and/or command line capabilities of the underlying operating system, e.g., Unix, Linux, or Windows. Thus the user 110 can control the system, interact with the system e.g., to provision the database, order tests, set test parameters and cycles, and obtain and manipulate results.

5. Communicator Module

The communicator module 108 acts as the communications interface between the other modules, (except the database interface module 102) and the provider network 14. It receives communications from the provider network in order to provide these to the global evaluator module 100, and likewise accepts communication from the scheduler module 98 in order to transmit these test schedule information and data over the network. The communicator module 108 basically functions as a translator and is analogous to such functionality, which is found in many systems utilizing communications with other entities. Such translation is needed since software components, including for instance the modules of the RAE 38, typically use data in somewhat different technical form or format than the form or format of data which is transported over a typical network. The communicator module 108 can use well-known methods for secure authenticated network communications, e.g., IPSEC, SSL, or SSH when communicating with TGEs 36 and MEAs 34. Via authentication, these secure communication methods ensure that no unauthorized entity can masquerade as a TGE 36, RAE 38, or MEA 34 i.e., impersonate a TGE 36, RAE 38, or MEA 34. Via encryption, the communicator module 108 further ensures that no unauthorized entity can intercept, eavesdrop upon, or alter any of the secured communications. The communicator module 108 maintains the shared secrets, cryptographic keys, and/or security certificates utilized to enable these secure communication methods.

D. Example of Virus or Mal-Ware Code

Figure 10:
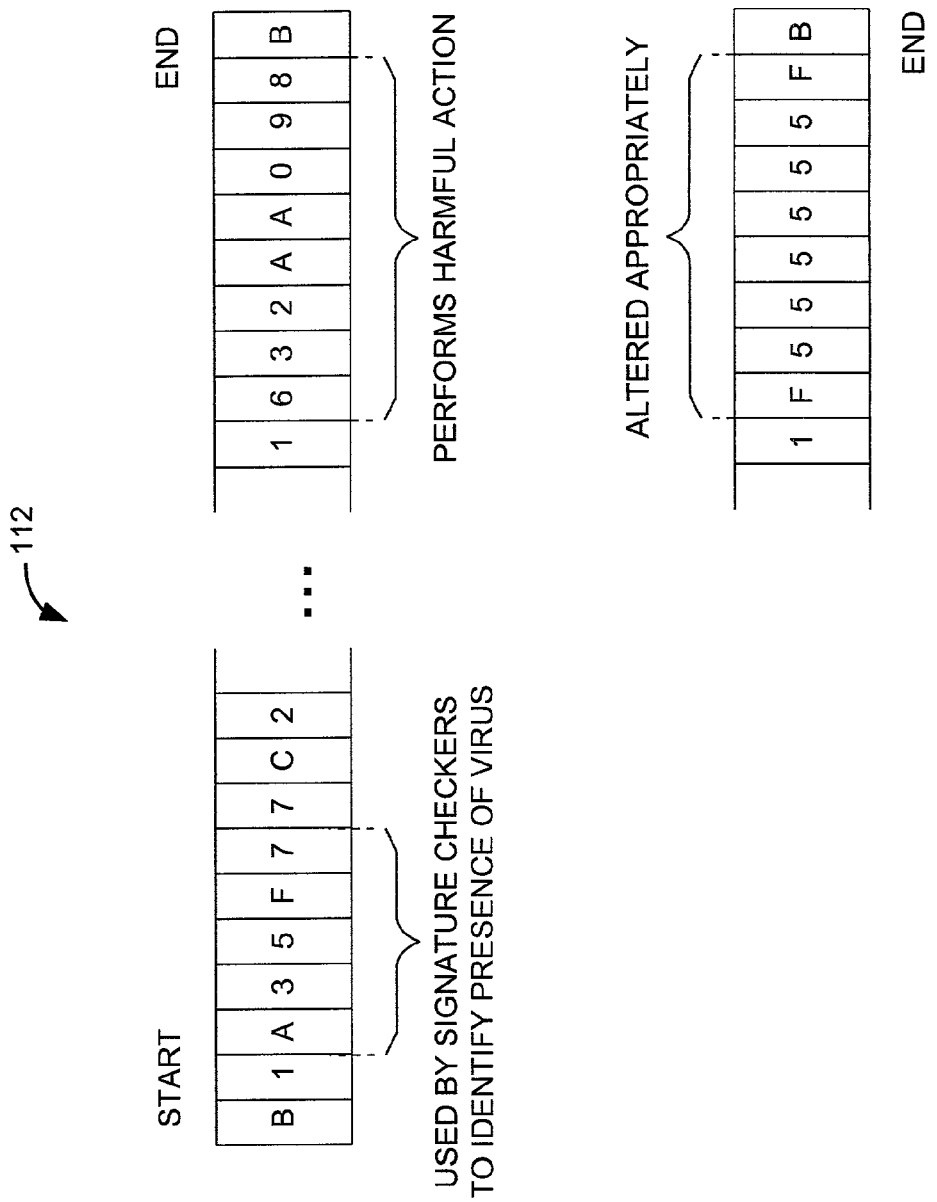
FIG. 10 is a block diagram of a preferred embodiment of an illustrative example of altering a harmful code in a virus or mal-ware code.

FIG. 10 is a block diagram 112 of an illustrative example of altering a harmful code in a virus or program, i.e., mal-ware code. The code is shown in a hexadecimal, or base-16, notation, e.g., 1, 2, 3 . . . A, B, C, . . . F. Signature checkers, for instance, anti-virus software, uses a portion of the code, A3555F77 to identify the presence of a virus. This portion of the code is not altered. A portion of the code, 632AA098, performs a harmful action. This portion of the code is altered. These code portions are typically different and are located in different locations within the code for each and every different virus or mal-ware used. Analysis of each virus or mal-ware is performed to determine both the location of the pertinent code portions, and the appropriate alteration needed to denature the code portions, which perform harmful actions. The harmful portion of the code, i.e., 632AA098, is altered to, F555555F, rendering the harmful portion of the code harmless.

E. Example of Denaturing a Bad Data Packet

Figure 11:
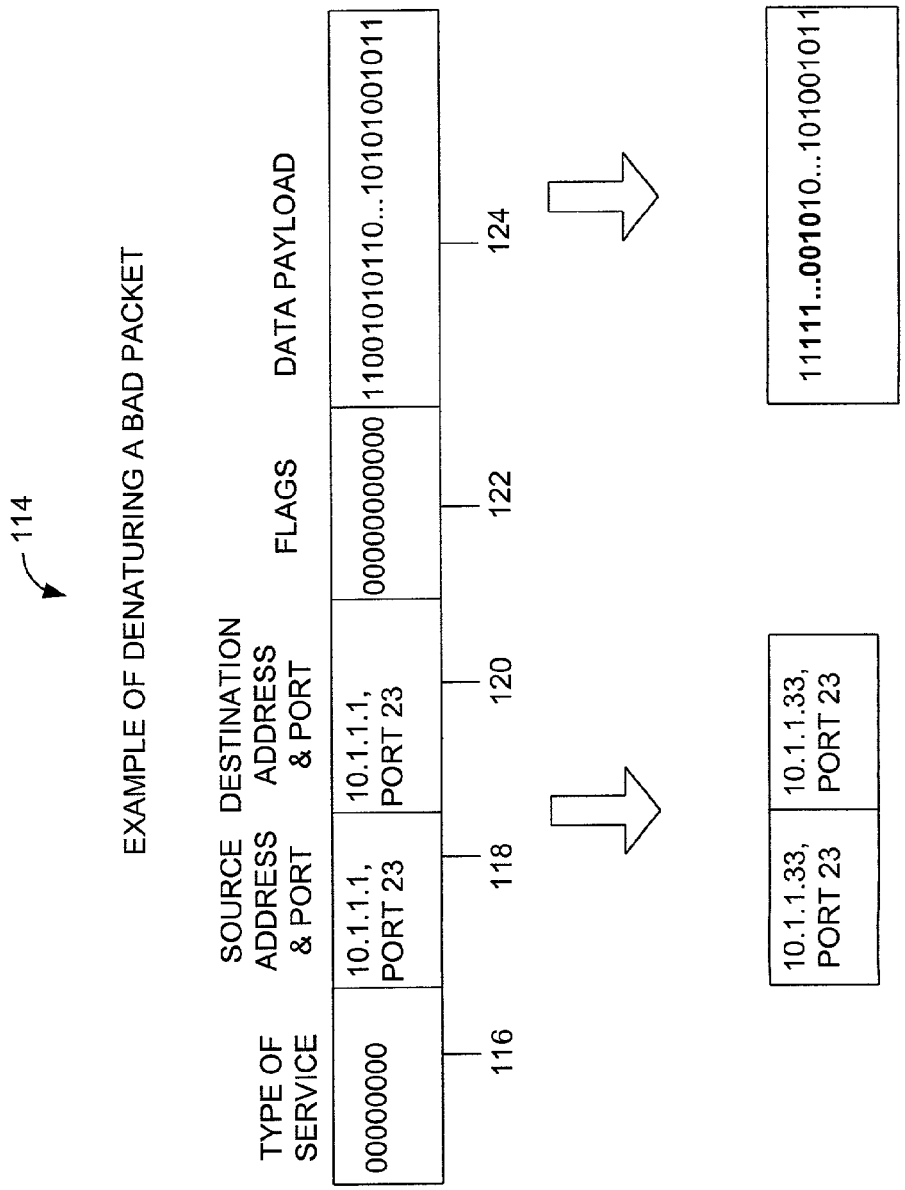
FIG. 11 is a block diagram preferred embodiment of an illustrative example of denaturing a bad data packet.

FIG. 11 is a block diagram 114 preferred embodiment of an illustrative example of denaturing a bad data packet. Additional fields, such as checksums, length fields, protocol conversion fields, etc., are not shown for simplicity. The block diagram of FIG. 11 shows a simplified example packet that could be used in a Land attack. Generally, a Land attack is a denial of service attack or crash attack wherein a TCP SYN packet (e.g., connection initiation) is sent that uses the same source and destination addressed for the target machine's IP address and port. This often causes operating systems to hang or crash, unless they are specifically designed and tested to resist such an attack. In the example of a Land attack shown in FIG. 11, the destination address is changed in order to denature the attack by "redirection." Land attacks typically have the same destination address and source address, and thus the source address is also being changed in this example. Changing the source address is necessary to maintain an equal relationship between the destination address and sources address to retain a suitably harmful appearance.

In an alternative embodiment, the source address need not be changed when the particular attack does not have a relationship between the destination address and the source address. In another alternative embodiment, it may be necessary to change other parts of the packet if the particular attack is defined by some relationship between the altered destination address and those other parts of the packet and the relationship should be maintained.

Referring to FIG. 11, the data packet includes fields for type of service 116, source address and port 118, destination address and port 120, flags 122 and data payload 124. In the Land attack, and some other attacks, the harmful characteristic is source address and port equal to the destination address and port. The harmful characteristic cannot itself be altered since that change makes the packet both harmless and no different from any regular packet, such that no security measure, even if interceding, would have any reason to block it. Thus, the destination address is changed. The potentially harmful packet is then directed at a MEA 34 near the target rather than the target itself. This process is called "denaturing by re-direction." Due to the properties of the Land attack, the source address is also changed. Both the source and destination addresses are changed from 10.1.1.1 to 10.1.1.33. Address 10.1.1.33 is the address of a nearby known MEA 34, which will receive the attack, if the attack is not blocked in transit to the MEA 34.

The example packet of FIG. 11 also includes another attack. This involves including the harmful portion of the packet in the data payload 124. An analysis of the bad packet attack type is necessary to determine both the location of the pertinent data elements and the appropriate alteration needed for the specific element or elements which cause harmful effect or effects. Referring to FIG. 11, to denature an attack against the data payload 124, an identifier code number is added to the payload so that MEAs 34 will be able to keep track and check against pre-scheduled attacks. For the data payload 124 of FIG. 2, an identified code of 111 . . . 0010, is added to the data payload 124.

Figure 12:
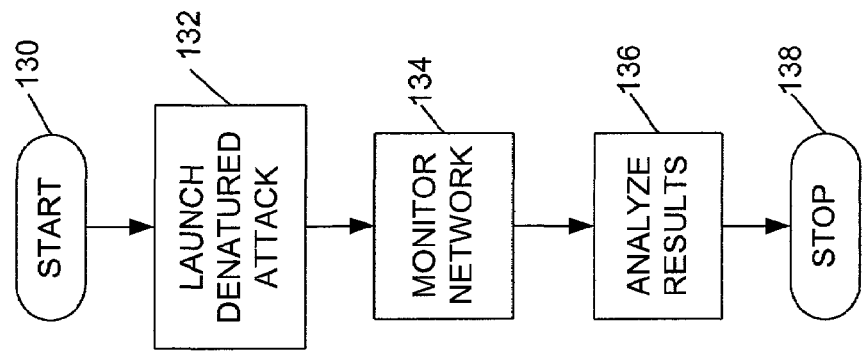
FIG. 12 is a flow chart depicting general functionality of a preferred embodiment of a system for the non-invasive monitoring of electronic security services.

IV. Preferred Embodiments of Functionality of System for the Non-Invasive Monitoring of Electronic Security Services FIG. 12 is a flow chart depicting general functionality of a preferred embodiment of a system for the non-invasive monitoring of electronic security services. The process begins at 130. At 132, a denatured attack is launched across a customer's network. In a preferred embodiment, the attack is launched using a TGE. At 134, the customer's network is monitored. In a preferred embodiment, the customer's network is monitored using a MEA. In an alternative embodiment, the customer's network is monitored prior to the launch of a denatured attack. In another alternative embodiment, the customer's network is monitored during the launch of the denatured attack. At 136, the results of the denatured attack are analyzed. In an alternative embodiment, the results of the denatured attack are analyzed during the launch of a denatured attack. The process ends at 138.

Figure 13A:
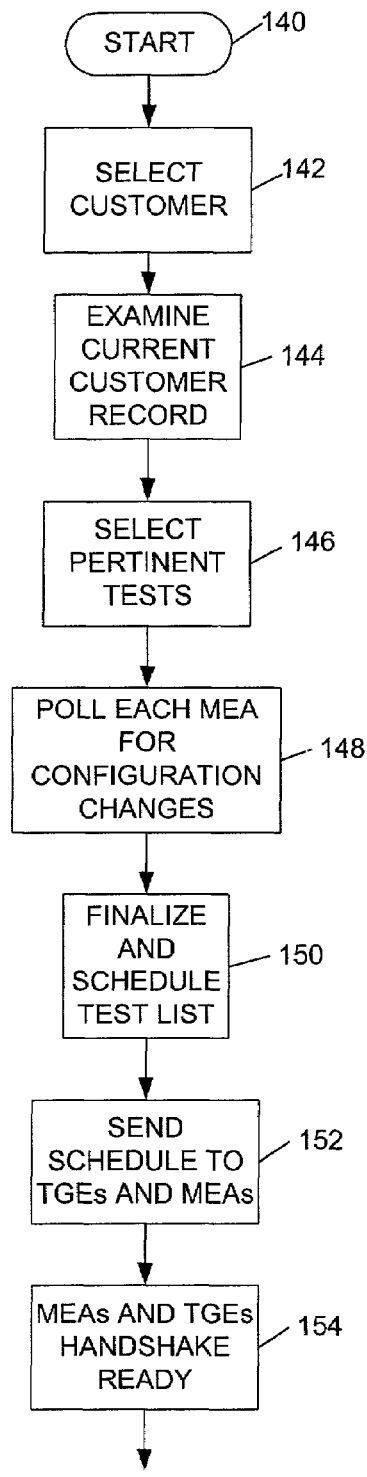
FIGS. 13A and 13B are flow charts depicting more specific functionality of a preferred embodiment of a system for the non-invasive monitoring of electronic security services.
Figure 13B:
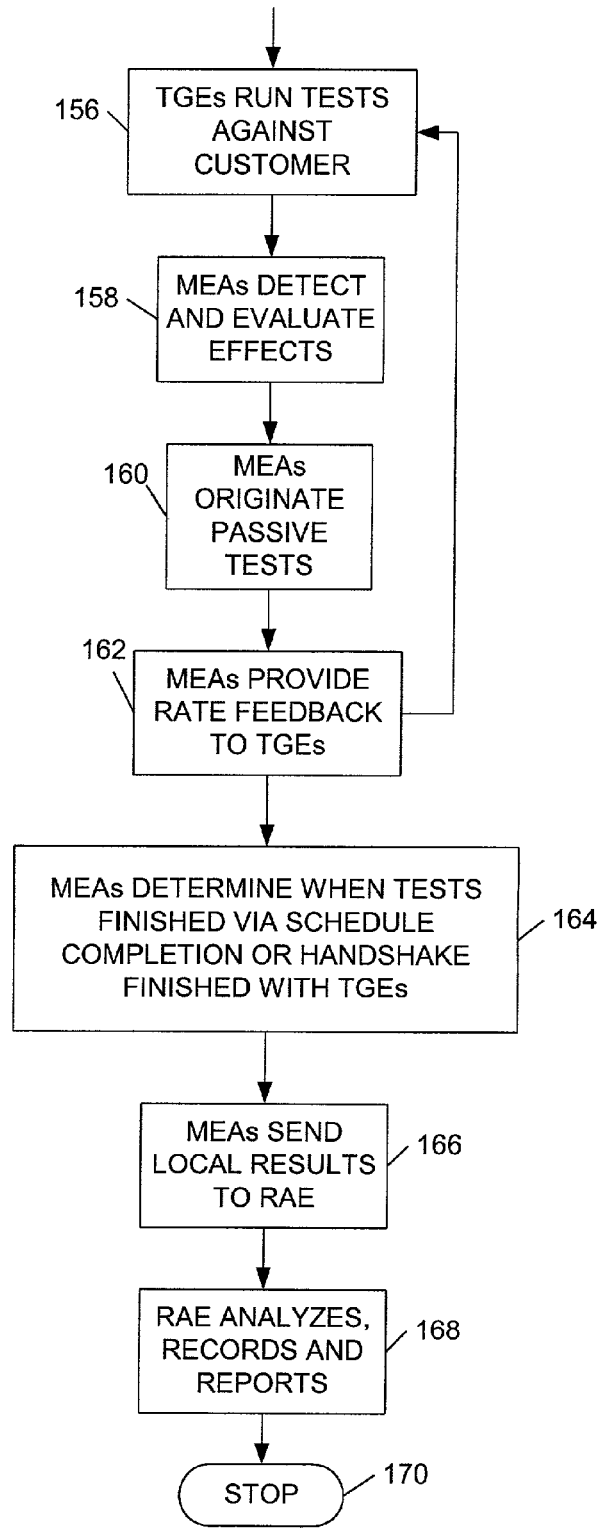

FIGS. 13A and 13B are flow charts depicting more specific functionality of a preferred embodiment of a system for the non-invasive monitoring of electronic security services. The process begins at 140. At 142, the service provider selects the customer that will be monitored and/or receive a denatured attack. At 144, an examination of the customer's current records occurs. The examination includes, among others, obtaining the MEA list, host and network configurations and services utilized by the customer. At 146, the service provider selects the pertinent tests to perform over the customer's network. The tests performed are based on certain parameters such as the design and topology of the customer's network, perceived threats and any unique customer concerns about the security of its network. At 148, each MEA is polled for configuration changes. Any configuration changes found are added to the current customer information and the test selection modified to accommodate the configuration changed. At 150, the test list is finalized and scheduled. In addition, the TGEs and MEAs that will be used in the test are selected.

At 152, the schedule for the test is sent to the TGEs and MEAs. The schedule is sent to the TGEs that will generate the attacks and the MEAs that will originate any passive attacks. The schedule also serves to inform the MEAs of planned attacks. At 154, the MEAs and TGEs perform handshake functions for a "ready" state.

Referring now to FIG. 13B, at 156, TGEs run tests against customer's network(s). In a preferred embodiment, the tests are run over a long period of time, for example, a week or a month. At 158, the MEAs detect and evaluate the effects of the tests. At 160, the MEAs originate any passive tests. At 162, each MEA provides rate feedback to the TGEs (those TGEs which originate the tests/attacks the MEA is monitoring). The rate feedback consists of data instructing each associated TGE to appropriately modify its rate of test generation and launching based on the MEA's monitoring/determination of test rates exceeding (or falling below) pre-set maximum (or minimum) thresholds, or otherwise exceeding (or falling below) test constraints pre-set or calculated by algorithmic means. At 164, the MEAs determine when the test cycles are finished utilizing a handshake with finished TGEs or based upon the completion of a scheduled test. At 166, each MEA sends its results to the RAE. At 168, the RAE analyzes, records and reports on the results of the tests for the selected customer. In a preferred embodiment, the results of the tests are summarized globally for the selected customer but may be localized as needed. At 170, the process ends.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

An advantage of this invention is that it provides for a set of harmless attacks against a customer's system that tests the effectiveness of the customer's electronic security services.

Another advantage of this invention is that the results of the harmless attacks can be monitored and a record of results maintained.

Still another advantage of this invention is that it performs the denatured attacks to a customer's network in a non-invasive method, for instance denatured attacks scheduled over a long period of time so as not to be noticeable by the customer. Further, feedback from the MEAs to the TGEs can adjust the rate of test launching so that the tests remain unobtrusive yet are completed in a timely manner.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A system for the non-invasive monitoring of the effectiveness of a customer's electronic security services, comprising:
   test generation means for generating and launching a denatured attack towards a customer's network;
   monitoring and evaluation means operatively coupled to the test generation means the monitoring and evaluation means for monitoring and evaluating the denatured attack; and
   recording and analysis means operatively coupled to the test generation means and the monitoring and evaluation means, the recording and analysis means for recording and analyzing results of the denatured attack.

2. The system of claim 1, wherein the monitoring and evaluation means further comprise at least one of a sniffer module, an innoculator module, an analyzer module, an evaluator module, a communicator module, a decryption and encryption module, or a cryptographic key module.

3. The system of claim 2, wherein the analyzer module is adapted to determine configuration changes that have occurred on the customer's network and to transmit the configuration changes to the recording and analysis means.

4. The system of claim 2, wherein the evaluator module is adapted to receive test data from the communicator module and analyzer module, and to evaluate whether a test or attack on the customer's network has caused harm to the customer's network, or would have caused harm, if not denatured.

5. The system of claim 2, wherein the innoculator module is adapted to receive at least one of test list of attacks, attack schedule, and attack identifiers from the test generation means.

6. The system of claim 2, wherein the sniffer module is adapted to process all communications incoming and outgoing to the monitoring and evaluation means and to access data packets received or transmitted.

7. The system of claim 2, wherein the communicator module is adapted to perform a communication interface function between selected modules of the monitoring and evaluation means and the provider's network.

8. The system of claim 1, further comprising further test generation means operatively coupled to the test generation means for use when multiple denatured attacks are launched that require coordination.

9. The system of claim 1, further comprising a scheduling module coupled to the test generation means for coordinating the denatured attacks between the test generation means, monitoring and evaluation means and recording and analysis means.

10. The system of claim 1, wherein the recording and analysis means further comprise a scheduling module for coordinating the denatured attacks between the test generation means, monitoring and evaluation means and recording and analysis means.

11. The system of claim 1, further comprising further monitoring and evaluation means associated with each component, device, or resource in the customer's network that requires non-invasive monitoring.

12. The system of claim 1, wherein the recording and analysis means further comprise at least one of a scheduler module, a global evaluator module, a user interface module, a communicator module, or a database interface module.

13. The system of claim 12, wherein the scheduler module is adapted to provide test scheduling, and to make test schedule test information available to the test generation means and the monitoring and evaluation means.

14. The system of claim 12, wherein the global evaluator module is adapted to analyze data returned by the monitoring and evaluation means.

15. The system of claim 12, wherein the user interface module is adapted to provide user interaction functionality and command line capabilities of an underlying operating system.

16. The system of claim 12, wherein the communicator module is adapted to provide a communication interface function between other modules and the provider network.

17. The system of claim 12, wherein the database interface module is adapted to provide functionality to enable provisioning and access to a database that contains customer data.

18. The system of claim 1, wherein the test generation means further comprise at least one of a tester module, a library module, a coordinator module, a server module or a communicator module.

19. The system of claim 18, wherein the tester module is adapted to perform testing.

20. The system of claim 18, wherein the library module is adapted to provide functionality to enable provisioning and access to a database that contains test or attack data.

21. The system of claim 18, wherein the coordinator module is adapted to obtain schedule information from the recording and analysis means, to handshake with the monitoring and evaluation means to signal when ready and finished, to handshake with further test generation means for cooperative tests requiring multiple test generation means, to control the server module, and to control the tester module.

22. The system of claim 18, wherein the server module is adapted to provide the test generation engine means with server functionality, including at least one of web, file, or email server.

23. The system of claim 18, wherein the communicator module is adapted to provide a communication interface function between other modules and the provider network.

24. The system of claim 1, wherein the denatured attack comprises a data packet reconfigured such that a harmful portion of the data packet has been rendered harmless.

25. The system of claim 1, wherein the denatured attack comprises a portion of executable or interpretable program code, the program code reconfigured as a harmless code and having an externally observable actions that mimic a harmful attack.

26. The system of claim 1, wherein the denatured attack comprises redirecting an attack from a targeted customer's resource to a nearby agent.

27. The system of claim 22, wherein the at least one of web, file or email server are configured to denature attacks involving requests to a server originating from a customer's client or from the monitoring and evaluation means.

28. The system of claim 1, wherein the monitoring and evaluation means are configured to adjust the rate of generation and launching of the denatured attack.

29. A non-invasive system for determining the effectiveness of electronic security service, comprising:
a customer network having a plurality of electronic security services;
a center having a test generation engine adapted to generate and launch denatured attacks towards the customer's network;
an agent coupled to the customer's network, the agent adapted to monitor and evaluate the denatured attack; and
a recording and analysis engine operatively coupled to the agent, the recording and analysis engine adapted to record and analyze the results of the denatured attack.

30. The system of claim 29, further comprising a scheduling module operative coupled to the test generation engine, agent and recording and analysis engine, the scheduling module adapted to coordinate the tasks of the test generation engine, agent and recording and analysis engine.

31. The system of claim 29, wherein the recording and analysis engine further comprises a scheduling module, the scheduling module adapted to coordinate the tasks of the test generation engine and agent.

32. The system of claim 29, wherein the agent further comprises at least one of a sniffer module, an innoculator module, an analyzer module, an evaluator module, a communicator module, a decryption and encryption module or a cryptographic key module.

33. The system of claim 29, wherein the test generation engine further comprises at least one of a tester module, a library module, a coordinator module, a server module, and a communicator module.

34. The system of claim 29, wherein the denatured attack comprises a data packet reconfigured such that a harmful portion of the data packet has been rendered harmless.

35. The system of claim 29, wherein the denatured attack comprises a portion of executable or interpretable program code, the program code reconfigured as a harmless code and having an externally observable actions that mimic a harmful attack.

36. The system of claim 29, wherein the denatured attack comprises redirecting an attack from a targeted customer's resource to a nearby agent.

37. The system of claim 29, wherein the test generation engine further comprises a server module adapted to provide the test generation engine with server functionality, including at least one of web, file, or email server, and wherein the servers are configured to denature attacks involving requests to a server originating from a customer's client or from the agent.

38. The system of claim 29, wherein the agent is configured to adjust the rate of generation and launching of the denatured attack.

39. A system for the non-invasive monitoring of a customer's electronic security services network, comprising:
means for generating and launching a denatured attack towards a customer's network;
means for monitoring and evaluating the denatured attack; and
means for recording and analyzing the results of the denatured attack.

40. The system of claim 39, further comprising means for scheduling the launch of the denatured attack.

41. A method for the non-invasive monitoring of the effectiveness of electronic security services on a customer's network, comprising:
launching a denatured attack of the customer's network; and
detecting and evaluating the effects of the denatured attack of the customer's network.

42. The method of claim 41, wherein launching a denatured attack over a communications network toward a monitored customer's network is performed using a test generation engine.

43. The method of claim 41, further comprising examining the customer's network for configuration changes.

44. The method of claim 41, further comprising scheduling a test list of denatured attacks to perform on the customer's network.

45. The method of claim 43, further comprising sending a schedule of the test list to each monitoring and evaluation agent coupled to customer's equipment and to at least one test generation engines coupled to a service provider's network.

46. The method of claim 41, further comprising originating passive tests of the customer's network by a monitoring and evaluation agent.

47. The method of claim 41, further comprising sending results of tests performed on the customer's network to a results and analysis engine.

48. The method of claim 47, further comprising analyzing, recording and reporting the results of the tests performed on the customer's network.

49. The method of claim 41, further comprising monitoring the customer's network for a non-denatured attack.

50. The method of claim 41, further comprising determining whether it is necessary to schedule the launching of the denatured attack.

51. The method of claim 50, further comprising scheduling the denatured attack if necessary.

52. The method of claim 51, further comprising generating the denatured attack.

53. The method of claim 41, wherein the denatured attack is performed by restructuring a harmful data packet into a data packet that closely resembles the harmful data packet with the harmful portions of the data packet rendered harmless.

54. The method of claim 41, further comprising adjusting the rate of launching of the denatured attack of the customer's network.

55. The method of claim 51, further comprising adjusting the rate of generating the denatured attack of the customer's network.

56. The method of claim 41, further comprising redirecting an attack from a targeted customer's resource to a nearby agent.

57. The method of claim 41, further comprising reconfiguring at least a portion of the denatured attack as a harmless portion, the harmless portion having externally observable actions that mimic a harmful attack.

58. A computer-readable storage medium having computer executable instructions stored thereon which, when executed by a computer, cause the computer to:
   launch a denatured attack over a communications network toward a monitored customer's network by implementing a test library module to obtain data which defines how to launch the attack.

59. A computer-readable storage medium having computer executable instructions stored thereon which, when executed by a computer, cause the computer to:
   schedule a launch of a denatured attack over a communications network toward a monitored customer's network.

60. The computer-readable storage medium of claim 58, comprising further computer-readable instructions which, when executed by the computer, cause the computer to:
   monitor of the customer's network for a denatured or non-denatured attack.

61. A computer-readable storage medium executable on a computer having a computer program for the non-invasive monitoring of a customer's electronic security services network, the program for performing having computer executable instructions stored thereon which, when executed by a computer, cause the computer to:
   analyze results of a launch of a denatured attack over a communications network toward a monitored customer's network.

* * * * *